United States Patent
Pacht

(10) Patent No.: US 10,628,137 B1
(45) Date of Patent: Apr. 21, 2020

(54) USER INTERFACE CUSTOMIZATION

(71) Applicant: Cerner Innovation, Inc., Kansas City, KS (US)

(72) Inventor: Isaac Pacht, Flushing, NY (US)

(73) Assignee: Cerner Innovation, Inc., Kansas City, KS (US)

( * ) Notice: Subject to any disclaimer, the term of this patent is extended or adjusted under 35 U.S.C. 154(b) by 0 days.

(21) Appl. No.: 15/394,199

(22) Filed: Dec. 29, 2016

(51) Int. Cl.
| | | |
|---|---|---|
| *G06F 8/38* | (2018.01) | |
| *G06F 9/54* | (2006.01) | |
| *G06F 8/656* | (2018.01) | |
| *G06F 8/34* | (2018.01) | |
| *G06F 8/40* | (2018.01) | |

(52) U.S. Cl.
CPC ............... *G06F 8/38* (2013.01); *G06F 8/34* (2013.01); *G06F 8/656* (2018.02); *G06F 9/541* (2013.01); *G06F 8/40* (2013.01); *G06F 9/543* (2013.01)

(58) Field of Classification Search
CPC ..... G06F 8/30; G06F 8/34; G06F 8/38; G06F 8/40; G06F 8/51; G06F 8/60–66; G06F 9/541
See application file for complete search history.

(56) References Cited

U.S. PATENT DOCUMENTS

| | | | |
|---|---|---|---|
| 6,801,227 B2 | 10/2004 | Bocioned et al. | |
| 6,883,144 B2 | 4/2005 | Zielinski et al. | |
| 7,051,012 B2 | 5/2006 | Cole et al. | |
| 7,246,326 B2 | 7/2007 | Haley | |
| 7,404,140 B2 | 7/2008 | O'Rourke | |
| 7,797,274 B2* | 9/2010 | Strathearn | G06F 17/30719 |
| | | | 707/609 |
| 7,836,401 B2 | 11/2010 | Hathaway | |
| 8,447,778 B2 | 5/2013 | DeHaan | |
| 8,560,819 B2* | 10/2013 | Fillipi | G06F 9/44 |
| | | | 709/220 |
| 9,058,352 B2 | 6/2015 | Dudala | |
| 9,117,183 B2 | 8/2015 | Buchan et al. | |
| 9,417,851 B2* | 8/2016 | Lane | G06F 8/30 |
| 9,721,315 B2 | 8/2017 | Christen | |
| 2005/0262494 A1* | 11/2005 | Fung | G06F 8/656 |
| | | | 717/170 |
| 2008/0082932 A1* | 4/2008 | Beumer | G06F 9/543 |
| | | | 715/770 |
| 2008/0195422 A1 | 8/2008 | Nessinger et al. | |
| 2009/0157608 A1* | 6/2009 | Strathearn | G06F 17/30017 |
| 2010/0088281 A1* | 4/2010 | Driesen | G06F 8/65 |
| | | | 707/641 |
| 2010/0146481 A1* | 6/2010 | Binder | G06F 8/656 |
| | | | 717/110 |
| 2011/0161989 A1* | 6/2011 | Russo | G06F 9/543 |
| | | | 719/328 |

(Continued)

*Primary Examiner* — Geoffrey R St Leger
(74) *Attorney, Agent, or Firm* — Shook, Hardy & Bacon LLP

(57) ABSTRACT

Systems and methods provide for customizing a user interface within a live production environment. Customizations may be input directly into the live production environment rather than a tool building application. This provides the opportunity for an editor to observe the customizations at runtime in the live production environment, which is not possible in tool building applications. The live production environment and the tool building application can communicate with one another such that user interaction between both tools is not necessary.

20 Claims, 13 Drawing Sheets

(56) References Cited

U.S. PATENT DOCUMENTS

| | | |
|---|---|---|
| 2012/0066691 A1* | 3/2012 | Branton .................. G06F 9/543 |
| | | 719/312 |
| 2012/0171649 A1 | 7/2012 | Wander et al. |
| 2013/0036375 A1* | 2/2013 | Zavatone ............ G06F 11/3664 |
| | | 715/763 |
| 2013/0326474 A1* | 12/2013 | Lane ......................... G06F 8/30 |
| | | 717/107 |
| 2014/0058748 A1 | 2/2014 | Ford et al. |
| 2014/0095206 A1 | 4/2014 | Fung et al. |
| 2016/0092347 A1 | 3/2016 | Edwards et al. |

\* cited by examiner

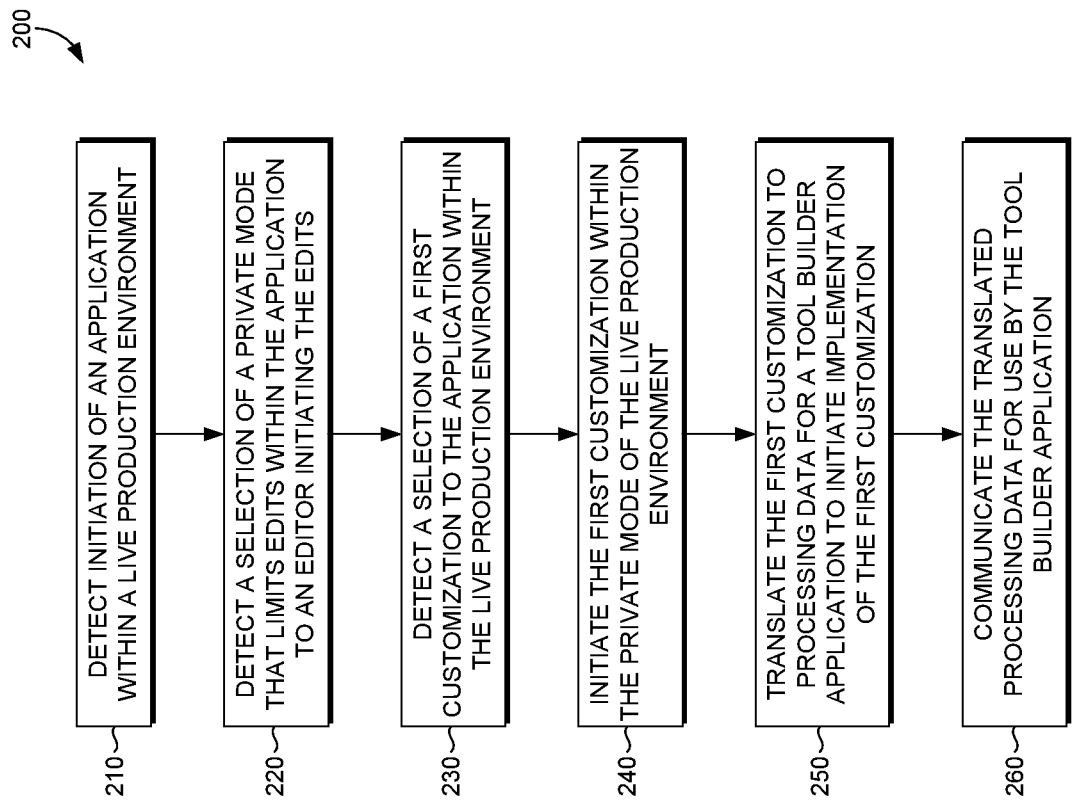

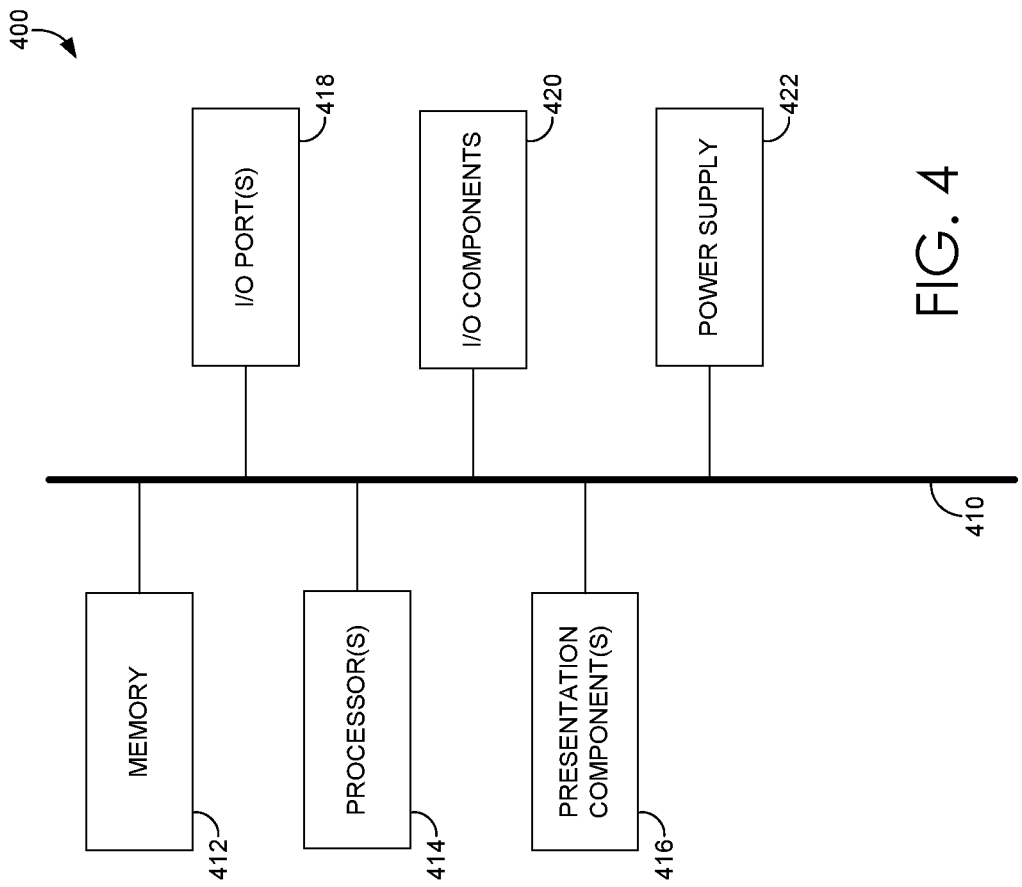

USER INTERFACE CUSTOMIZATION

BACKGROUND

Developing software applications for a company can be a time-consuming task involving multiple parties. Typically, editors can go into a tool builder application to implement various changes in an application, including user interface customizations (e.g., content, style, etc.). The edits are typically performed within a tool builder application that is not a live production environment. Since the tool builder application is not a live production environment, there is not a way to see how the edits will be implemented. For example, if an editor changes a user-defined field in a user interface, the behavior of the user-defined field may depend on various conditions including, for instance, whether the user is performing an inpatient or outpatient admission. The logic needed to vary the user-defined field based on various criteria is not present in the tool builder application. Thus, customizations of user interfaces may often include multiple back-and-forth interactions between a designer and the tool builder application (to input the customization) and the designer and the live production environment (to observe the change in the live environment).

SUMMARY

Embodiments of the present invention relate to, among other things, a design implementation that facilitates the design of user interfaces within the live production environment. In this regard, editors can input edits/customizations into the live production environment and, upon inputting the customization, immediately observe the customization running in the application in the live production environment.

The live production environment may automatically translate the customizations into processing code needed to implement the change into a tool builder application. The processing code can automatically be relayed to the tool builder application without user input to initiate the relay of information. Various embodiments are described herein that facilitate communication between the live production environment and the tool builder application. In embodiments, the tool builder application is utilized for medical applications.

Accordingly, in one aspect, an embodiment of the present invention is directed to one or more computer storage media storing computer-useable instructions that, when executed by a computing device, cause the computing device to perform operations. The operations include detecting initiation of an application within a live production environment; detecting a selection of a private mode that limits edits within the application to an editor initiating the edits; detecting a selection of a first customization to the application within the live production environment; initiating the first customization within the private mode of the live production environment; translating the first customization to processing data for a tool builder application to initiate implementation of the first customization to the application; and communicating the translated processing data for use by the tool builder application.

In another embodiment, an aspect is directed to a computer-implemented method for design of user interfaces within a live production environment. The method includes detecting initiation of an application within a live production environment; detecting a selection of a private mode that limits edits within the application to an editor initiating the edits; detecting a selection of a first customization to the application within the live production environment; integrating the first customization into the private mode of the live production environment; providing implementation of the first customization within the private mode of the live production environment; translating the first customization to processing data for a tool builder application to initiate implementation of the first customization; and communicating the translated processing data to an interceptor for use by the tool builder application, wherein the interceptor is a tool that communicates with both the tool builder application and the application.

A further embodiment is directed to a computer system comprising: one or more processors; and one or more computer storage media storing computer-useable instructions that, when used by the one or more processors, cause the one or more processors to: detect initiation of an application within a live production environment; detect a selection of a private mode that limits edits within the application to an editor initiating the edits; detect a selection of a first customization to the application with the live production environment; initiate the first customization within the private mode of the live production environment; translate the first customization to processing data for a tool builder application to initiate implementation of the first customization within the application; and communicate the translated processing data for use by the tool builder application.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 1A-1J are screenshots illustrating a user interface design tool being used to customize a user interface within a live production environment, in accordance with some implementations of the present disclosure;

FIG. 2 is a flow diagram showing a first exemplary method for customizing a user interface within a live production environment in accordance with some implementations of the present disclosure;

FIG. 4 is a block diagram of an exemplary computing environment suitable for use in implementations of the present disclosure.

DETAILED DESCRIPTION

Figure 1A:

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide tools for customization of a user interface within a live production environment. The customization involves an innovative approach to communication between a live production environment and a tool builder application such that an editor can input edits/customizations into a live production environment and actually observe how the edits will perform within the runtime live production environment. The edits can, if approved to be implemented, be communicated to either the tool builder application directly or to an interceptor tool that communicates with both the tool builder application and the live production environment. No input from a user is needed to facilitate the communication between the live production environment and the tool builder application.

The interceptor tool may be, in embodiments, a clipboard application. Clipboard applications are typically used by users when they explicitly cut and paste items to be saved or sent elsewhere. The explicit user command is not necessary when the clipboard is used in the present invention as an intermediary point between the tool building application and the live production environment. The live production environment may be configured to automatically communicate the changes to the interceptor tool. The interceptor tool can then either communicate the changes to the tool builder application or the tool builder application may be configured to listen to the interceptor tool such that the tool builder application detects any changes that are uploaded to the interceptor tool by the live production environment. Thus, a user is not required to interact with either the tool builder application or the interceptor tool for changes to be carried over to the tool builder application for implementation.

This implementation provides a number of advantages. Because the editor is able to actually observe the changes in a runtime live production environment, the number of back and forth interactions between the editor and the live production environment and the editor and the tool builder application are significantly reduced or eliminated when customizing the user interface. Previously, only the tool builder application has been the available option to implement any customizations and the live production environment was available only for observing the customizations. By providing a mechanism to allow communication between the two and to enable customizations within the live production environment, consistency and efficiency in user interface design are increased.

By way of example to illustrate, FIGS. 1A-1J are screenshots showing use of a live production environment to customize a user interface in accordance with an embodiment of the present invention. In particular, the screenshots of FIGS. 1A-1J provide an example in which a field label of a user interface is customized. Referring initially to FIG. 1A, an illustrative screen display is provided showing a user interface 100 including a field label 101 and an input area 102. The user interface 100 is shown within a live production environment. In this example, the live production environment is within a browser application. The browser application may be run locally. The tool builder application may be run locally or as a remote application. Alternatively, the tool builder application may be a subset of a main application such that if the main application is a web application, the same web/main application may contain additional logic that can carry out the operations of the tool builder application.

Figure 1B:
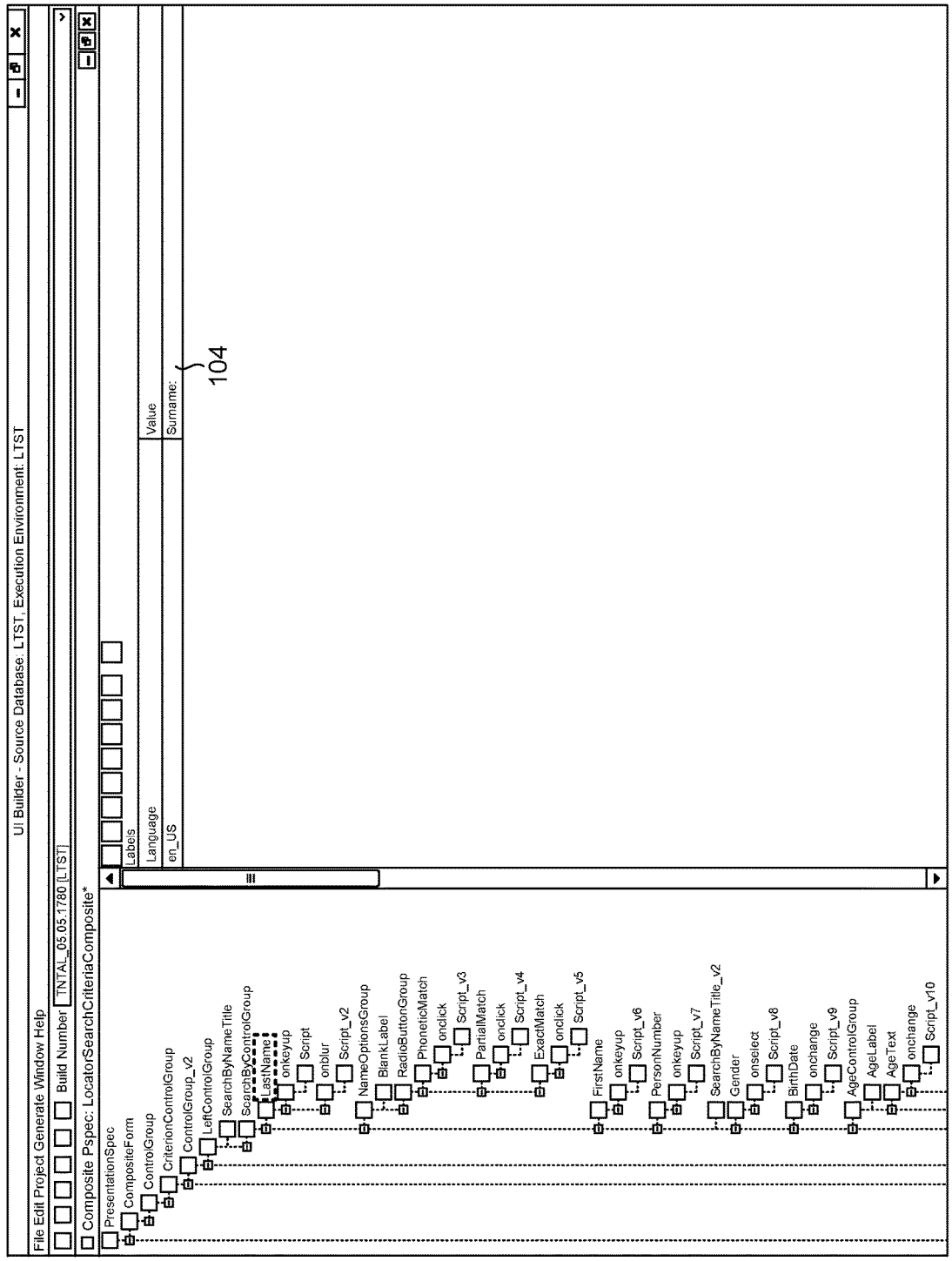

As shown, the application, as running in the browser, includes the field label 101 that reads "Last Name." The input area 102 provides an area for a user to provide a response to the field label 101. There may be any number of other field labels including, as shown in the user interface 100, age, birth date, gender, First Name, address, city, state, etc. FIG. 1B provides a user interface 103 for input of a customization to the user interface 100 shown in FIG. 1A. The editing field 104 provides an area for an editor to input an edited value. Here, as shown, the editor is replacing "Last Name" with "Surname" in the user interface 100 via customization user interface 103.

Often times, editors will want to test their customizations before implementing the changes in the application or displaying the changes to other users. An edit mode may be selected that enables an editor to initiate edits. This may be a separate step or consolidated with a private mode selection, as discussed below. In that situation, a selection of the private automatically enables an editor to initiate edits and provides options on privacy of the edits.

Figure 1C:
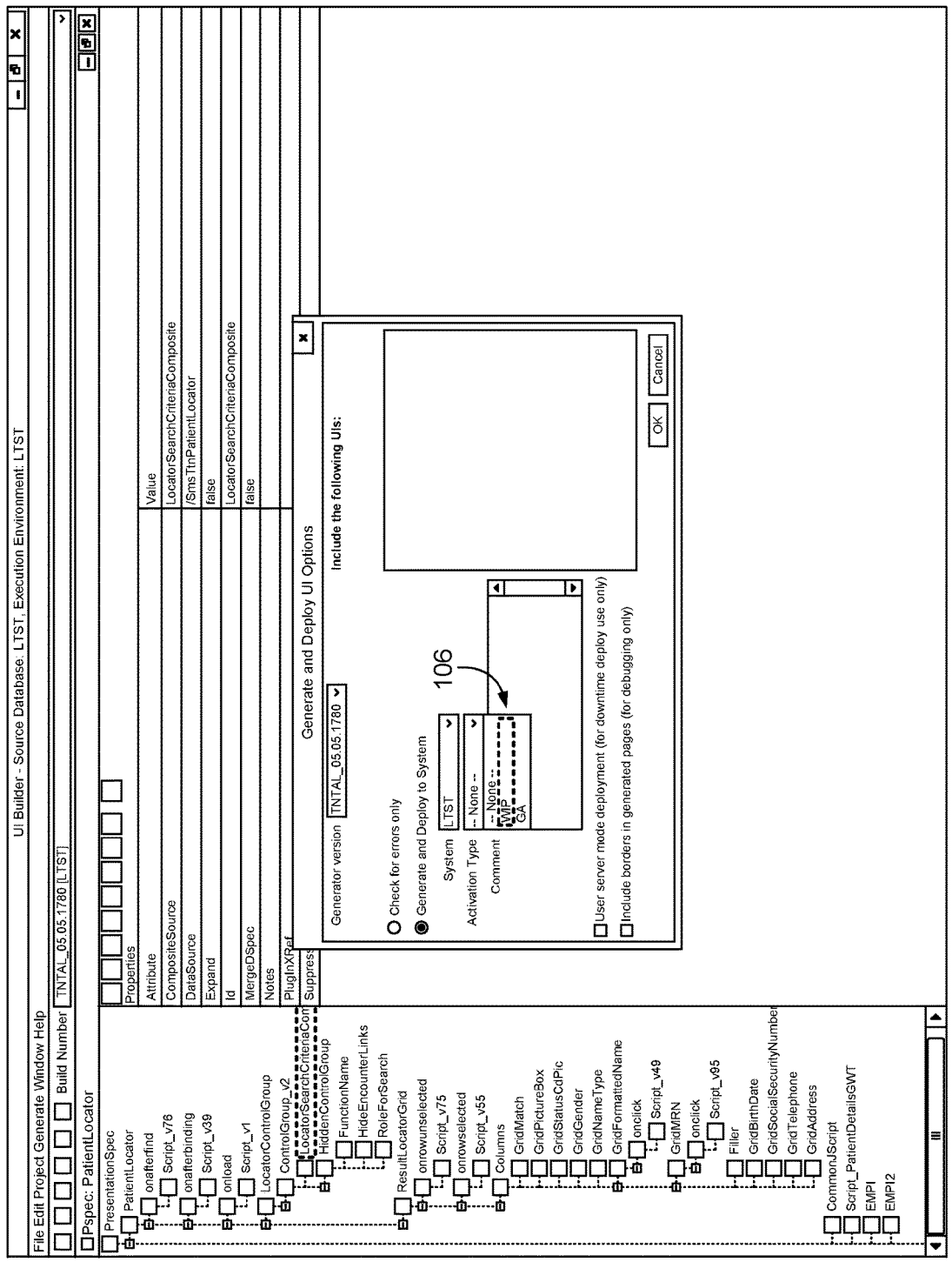

The private mode, or "work in progress" (WIP) mode may be selected to preserve the privacy of any edits made to the application. FIG. 1C illustrates such an embodiment. Privacy selection interface 105 provides deployment options from which an editor can select. Here, for example, WIP mode (i.e., privacy mode) may be selected or a "general audience" (GA) mode. GA mode allows for any other user to view the customization while WIP mode allows only select users to view the customization. WIP mode may only be available for the editor initiating the edits. Alternatively, WIP mode may be available to other users approved by the editor initiating the edits. Further, the customizations may be available to anyone else operating in WIP mode. WIP mode may also be customized per user such that each user can see a different subset of customizations.

Figure 1D:
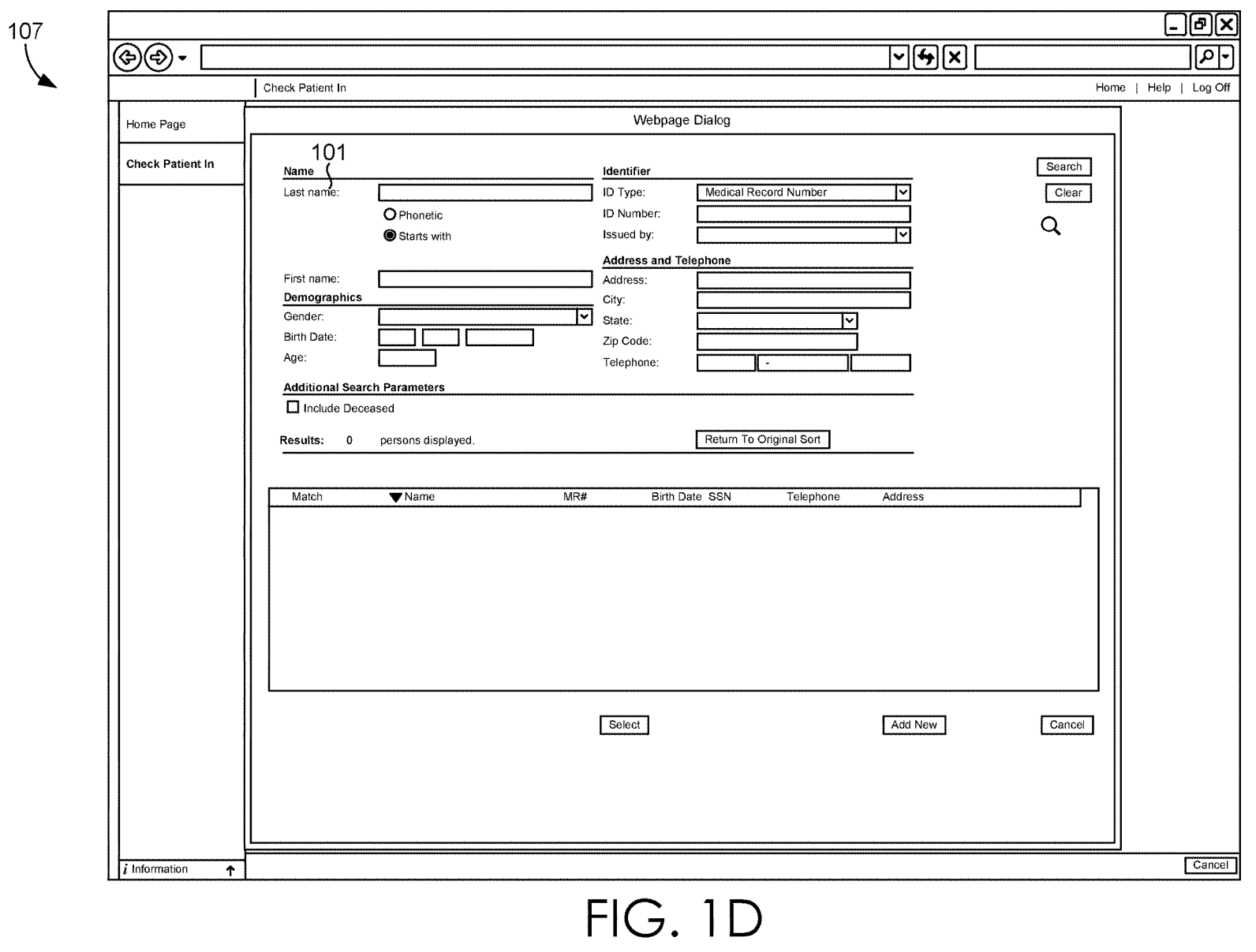
Figure 1E:
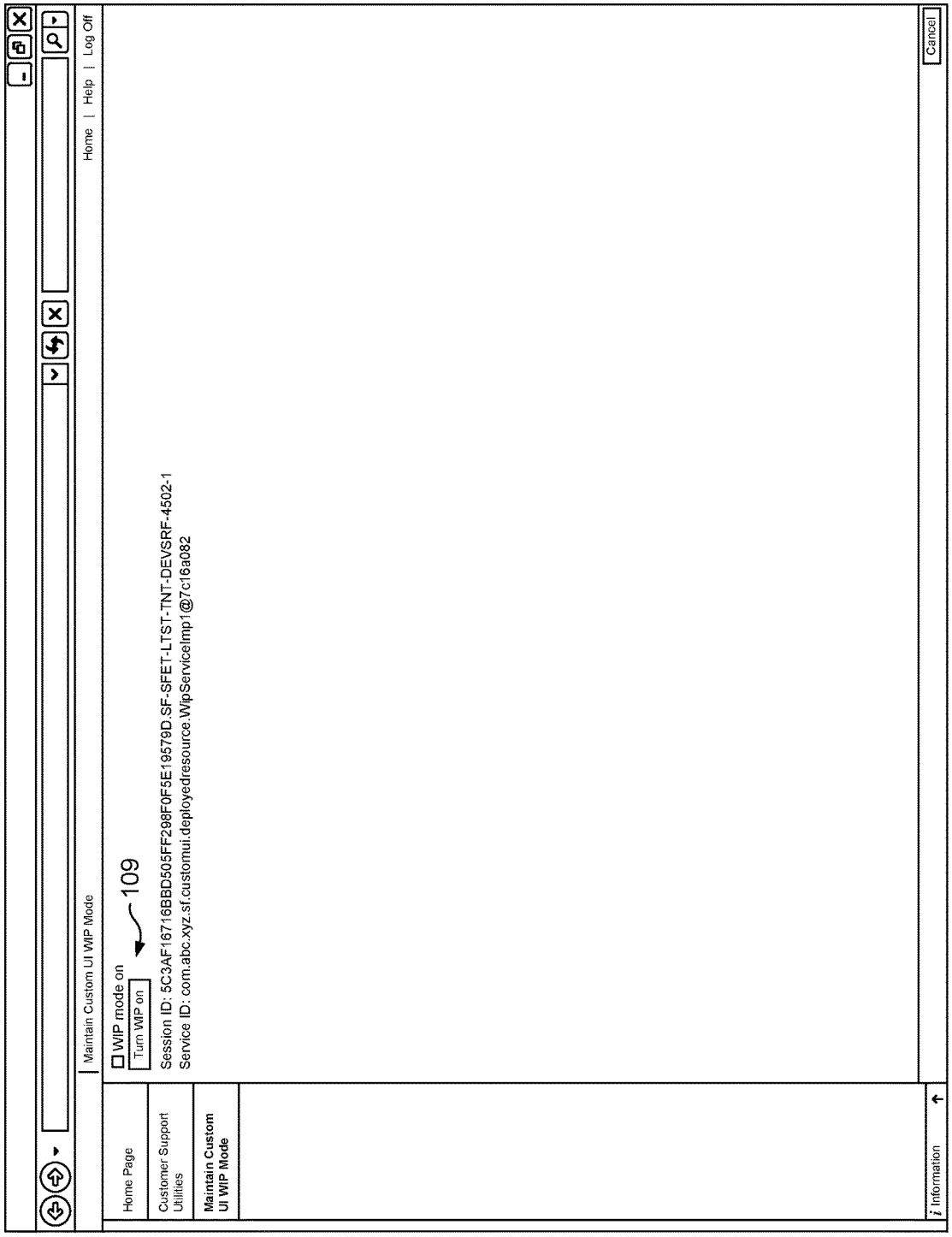
Figure 1F:
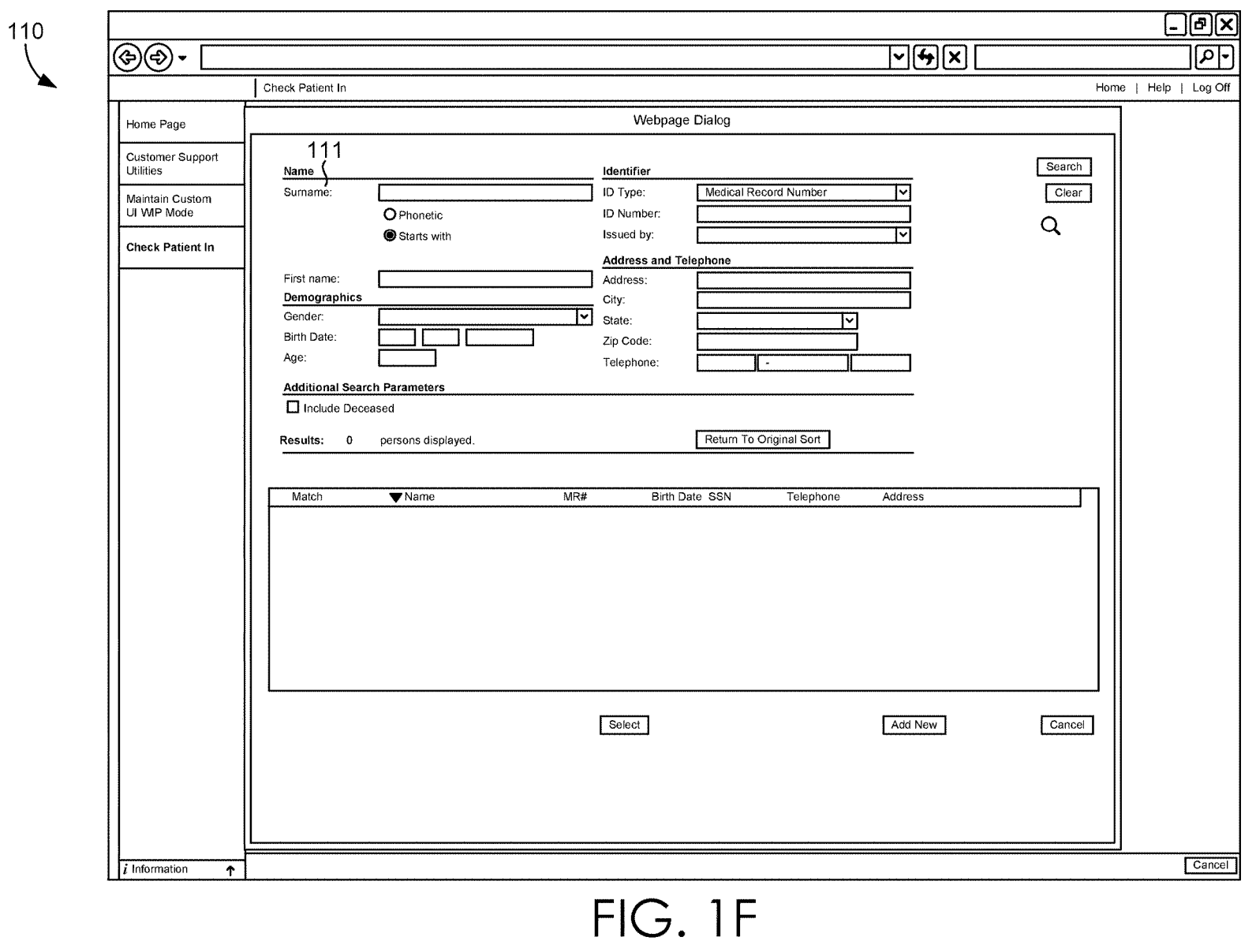

Here, the WIP icon 106 is highlighted as being selected by the editor. In this example, selection of WIP mode allows for the customizations to be viewed by other users operating in WIP mode. FIG. 1D illustrates this embodiment and only provides the WIP mode customizations to those that are operating in WIP mode. The user interface 107 still includes field label 101 reciting "Last Name" as the user is not operating in WIP mode. FIG. 1E provides an interface 108 for switching between activating and deactivating WIP mode. Here, the indicator 109 activates WIP mode such that a user is able to view customizations made in the live production environment that are not yet initiated in the tool builder application. FIG. 1F illustrates the user interface 110 in WIP mode. As such, the customization changing "Last Name" to "Surname" is displayed at field label 111.

Figure 1G:
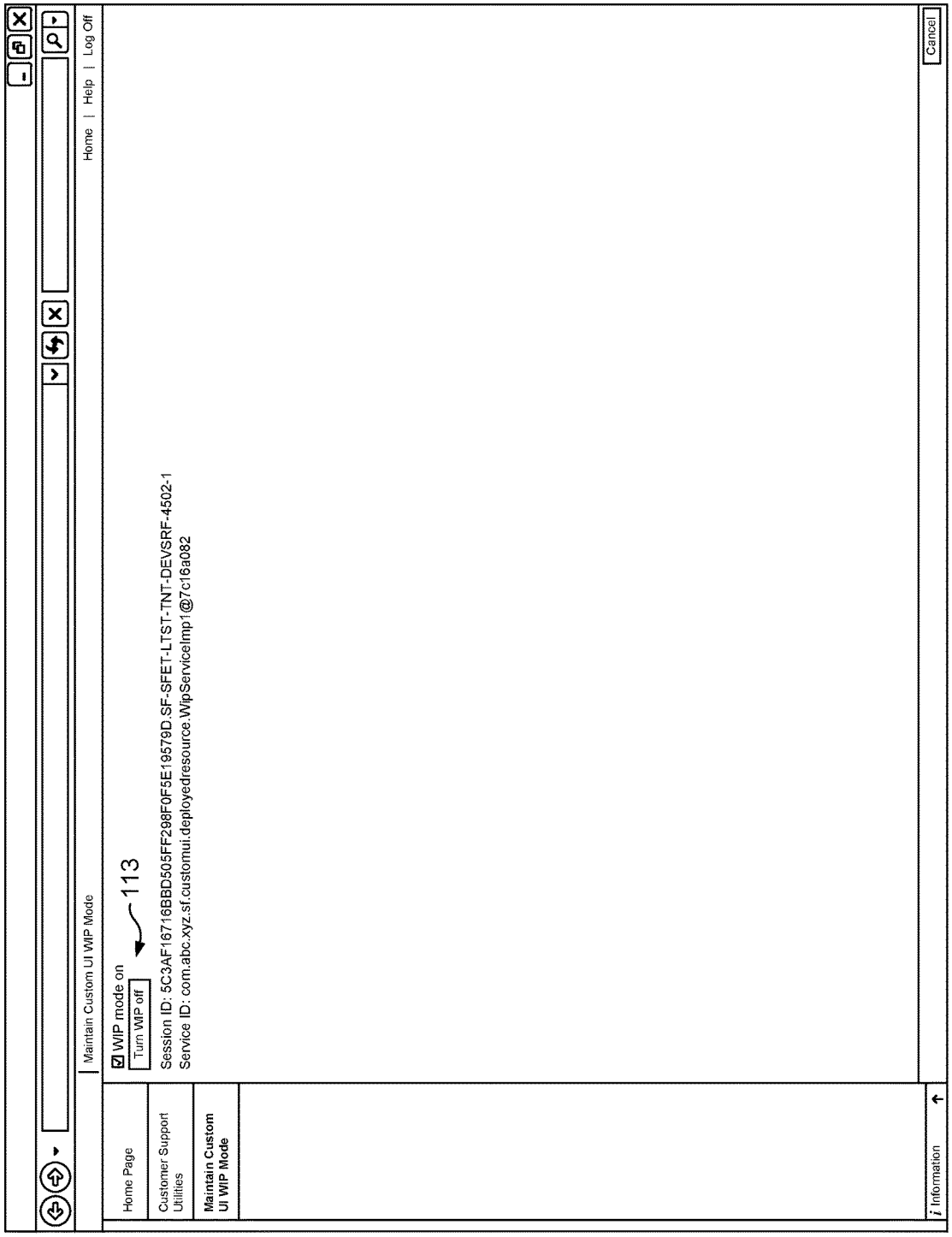
Figure 1H:
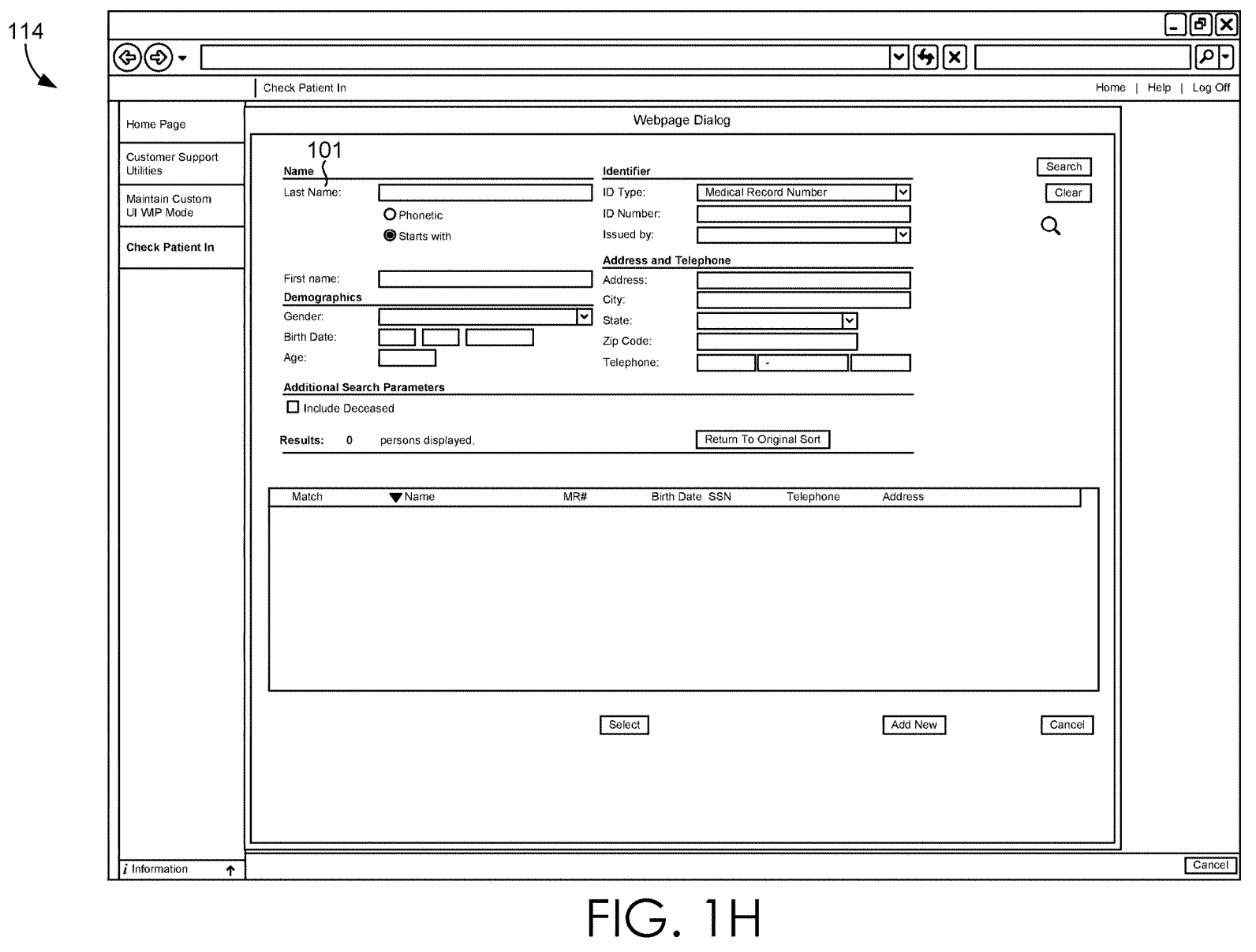
Figure 11:
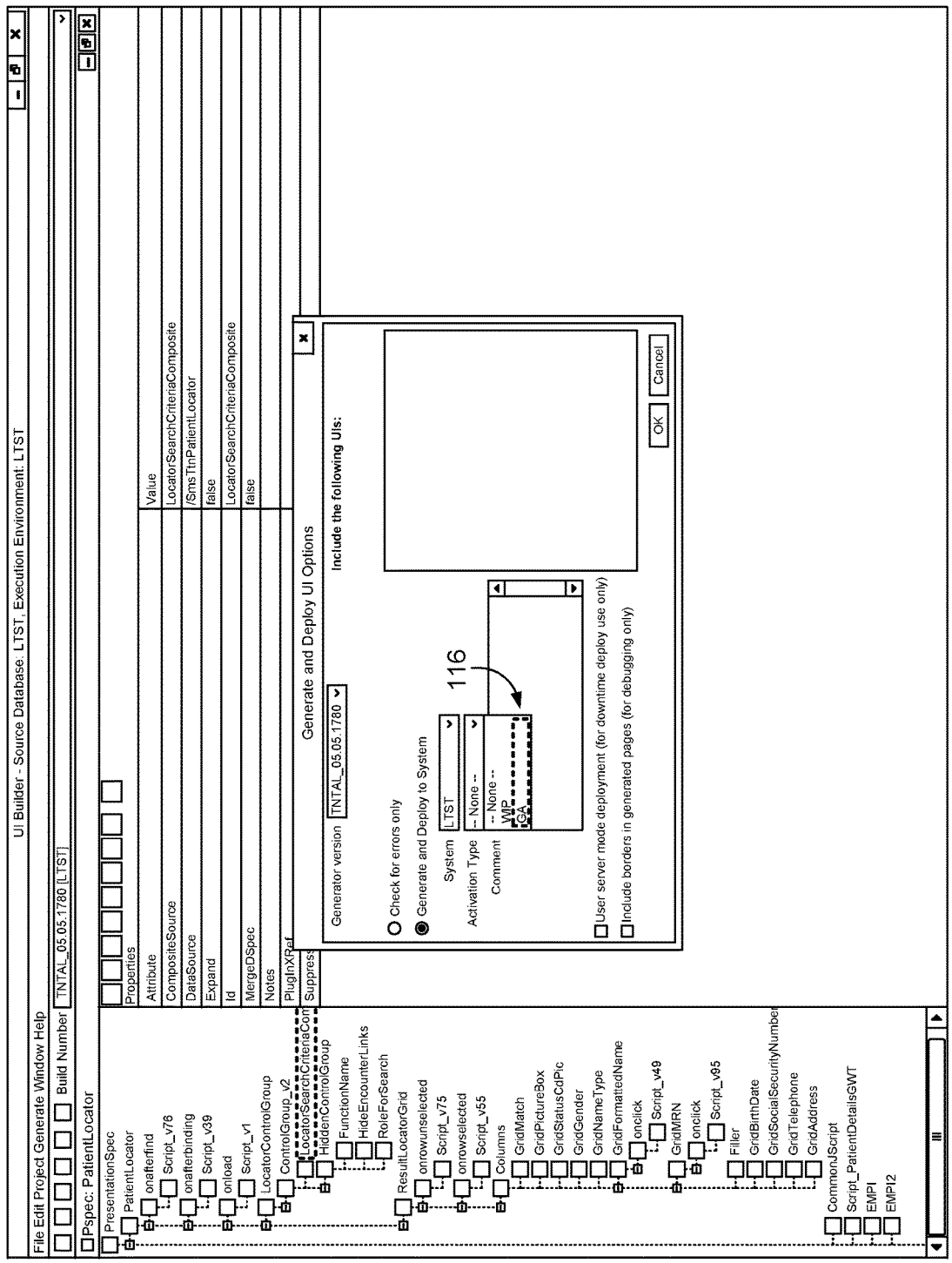
Figure 1J:
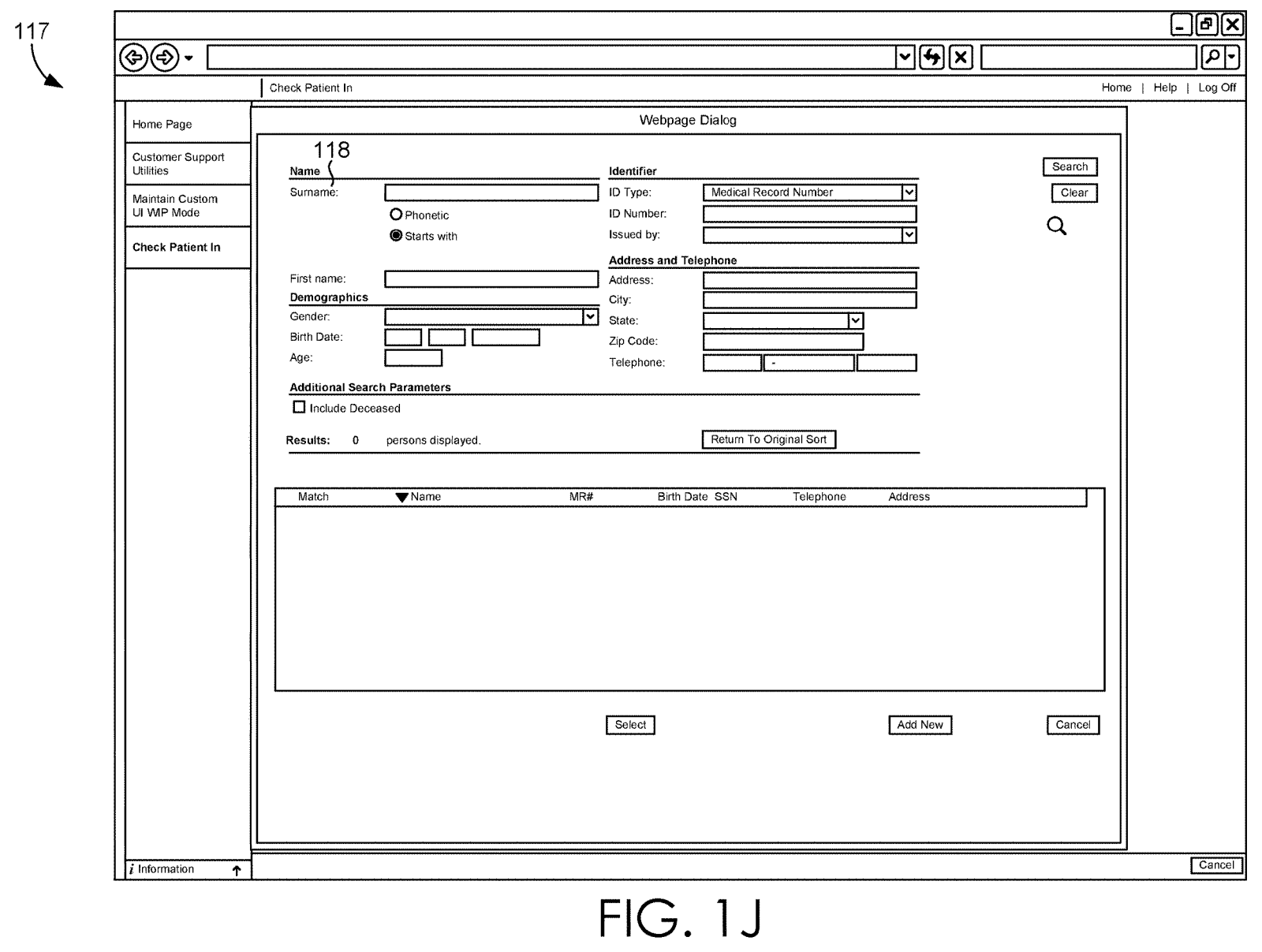

As with activating WIP mode, deactivating WIP mode is also an option for users. FIG. 1G illustrates deactivation of WIP mode in interface 112 by selection of the indicator 113. This, in turn, will cause any customizations that are only available in WIP mode to not be displayed in the live production environment as shown in FIG. 1H where the interface 114 includes field label 101 again as the customizations are no longer visible (because the application is not running in WIP mode).

At any point during the customization, an editor can opt to deploy the customizations within the application. To initiate the customization in the application, and not just observe the effects in the live production environment, the editor approves the customizations. One option is for the editor to select that the customizations are available to the general audience in the live production environment. This reduces the need to go back and forth between the tool builder application and the live production environment. Another option is provided in FIG. 1I. A tool builder deployment interface 115 is provided within the tool builder application separate from the live production environment. Here, in the tool builder application, customizations may be input and deployed to various users but the runtime action of the customization is not observed within the tool builder application. The tool builder application lacks the logic necessary to know how a customization will perform at runtime. The tool builder deployment interface 115 provides for a WIP deployment and a GA deployment, as previously described with respect to the live production environment. Here, the indicator 116 indicates that the GA deployment is selected. Thus, the customization will be deployed to all users and initiated within the application in the live production environment. This results in the customization being visible within the live production environment, as illustrated in interface 117 of FIG. 1J where the field label 118 indicates the customized change. The customizations are visible even to those users that are not operating in WIP mode.

As briefly described above, the live production environment and the tool builder application may communicate with one another behind the scenes, without user interaction initiating the communication. An embodiment provides for the live production environment to relay information directly to the tool builder application. In that regard, the live production environment may translate the customizations into processing code used by the tool builder application to initiate the customizations into the application.

Alternatively, the live production environment may communicate with an intermediary application (e.g., interceptor tool) that communicates with both the live production environment and the tool builder application. In an embodiment, the intermediary application is a clipboard application. The clipboard application may be configured to listen to and communicate with both the live production environment and the tool builder application. For instance, customizations made in the live production environment may be automatically communicated to the tool builder application by the clipboard application. The clipboard application may, for instance, listen for customization indicators from the live production environment. The live production environment will translate processing code for use by the tool builder application and, upon detecting a presence of translated processing code, the clipboard application could retrieve that information to either store temporarily (until retrieved by the tool builder application) or to communicate automatically to the tool builder application.

With reference now to FIG. 2, a flow diagram is provided illustrating a method 200 for user interface customization within a live production environment. Each block of the method 200 and any other method described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 210, the live production environment detects initiation of an application within the live product environment. At block 220, a selection of a private mode that limits edits within the application to an editor initiating the edits is detected. At block 230, a selection of a first customization to the application within the live production environment is detected. The first customization is initiated within the private mode of the live product environment at block 240. The first customization is translated to processing data for a tool builder application to initiate implementation of the first customization at block 250. At block 260, the translated processing data is communicated for use by the tool builder application.

Figure 3:
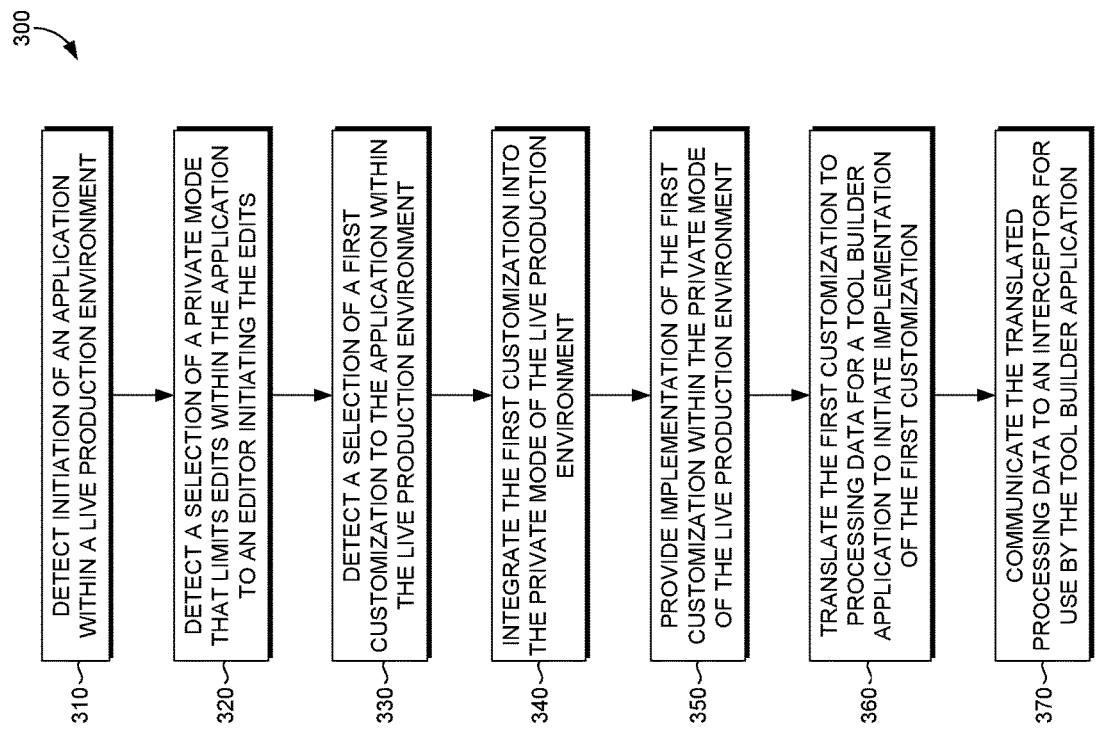
FIG. 3 is a flow diagram showing a second exemplary method for customizing a user interface within a live production environment in accordance with some implementations of the present disclosure.

With reference now to FIG. 3, a flow diagram is provided illustrating a method 300 for user interface customization within a live production environment. Each block of the method 300 and any other method described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 310, initiation of an application within a live production environment is detected. A selection of a private mode that limits edits within the application to an editor initiating the edits is detected at block 320. At block 330, a selection of a first customization to the application within the live production environment is detected. The first customization is integrated into the private mode of the live production environment at block 340. Implementation of the first customization within the private mode of the live product environment is provided at block 350. At block 360, the first customization is translated to processing data for a tool builder application to initiate implementation of the first customization. At block 370, the translated processing data is communicated to an interceptor for use by the tool builder application.

Having described implementations of the present disclosure, an exemplary operating environment in which embodiments of the present invention may be implemented is described below in order to provide a general context for various aspects of the present disclosure. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes bus 410 that directly or indirectly couples the following devices: memory 412, one or more processors 414, one or more presentation components 416, input/output (I/O) ports 418, input/output components 420, and illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion.

As described above, implementations of the present disclosure relate to a design tool that facilitates generating user interface code for applications. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by a computing device, cause the computing device to perform operations, the operations comprising:
   detecting initiation of an application within a live production environment;
   detecting a selection of a private mode that limits edits within the application to an editor initiating the edits, wherein the private mode is selected using a tool builder deployment interface selectable by the editor for interchanging between the private mode and a general audience mode, and wherein the tool builder deployment interface is separate from the live production environment;
   detecting a selection of a first customization to the application within the live production environment;
   initiating the first customization within the private mode of the live production environment;
   translating the first customization to processing data for a tool builder application to initiate implementation of the first customization, wherein the tool builder application comprises the tool builder deployment interface; and
   communicating the translated processing data to an interceptor tool for use by the tool builder application, wherein the translated processing data is automatically detectable by the tool builder application based on the communication of the translated processing data to the interceptor tool and without additional communication to the tool builder application from either the interceptor tool or the live production environment; and wherein the interceptor tool communicates with both the tool builder application and the live production environment.

2. The one or more computer storage media of claim 1, wherein the live production environment is within a browser.

3. The one or more computer storage media of claim 1, wherein the application is run locally on a computing device.

4. The one or more computer storage media of claim 1, wherein the operations further comprise:
  detecting initiation of the tool builder application separate from the application.

5. The one or more computer storage media of claim 4, wherein the tool builder application is not a live production environment.

6. The one or more computer storage media of claim 4, wherein the tool builder application is run remote from the computing device.

7. The one or more computer storage media of claim 1, wherein the operations further comprise:
  releasing the first customization upon detecting the private mode is deactivated.

8. The one or more computer storage media of claim 1, wherein the private mode further comprises one or more additional editors approved by the editor initiating the edits.

9. A computer-implemented method for generating a user interface for an application, the method comprising:
  detecting initiation of an application within a live production environment;
  detecting a selection of a private mode that limits edits within the application to an editor initiating the edits, wherein the private mode is selected using a tool builder deployment interface selectable by the editor for interchanging between the private mode and a general audience mode, and wherein the tool builder deployment interface is separate from the live production environment;
  detecting a selection of a first customization to the application within the live production environment;
  integrating the first customization into the private mode of the live production environment;
  providing implementation of the first customization within the private mode of the live production environment;
  translating the first customization to processing data for a tool builder application to initiate implementation of the first customization, wherein the tool builder application comprises the tool builder deployment interface; and
  communicating the translated processing data to an interceptor tool for use by the tool builder application, wherein the interceptor tool is a tool that communicates with both the tool builder application and the application; and wherein the translated processing data is automatically detectable by the tool builder application with only communication to the interceptor tool and without additional communication to the tool builder application from either the interceptor tool or the live production environment.

10. The method of claim 9, wherein the live production environment is within a browser.

11. The method of claim 9, wherein the application is run locally on a computing device.

12. The method of claim 9, wherein the method further comprises:
  detecting initiation of the tool builder application separate from the application.

13. The method of claim 12, wherein the tool builder application is remote from a computing device and is not a live production environment.

14. The method of claim 9, wherein the method further comprises:
  releasing the first customization upon detecting the private mode is deactivated.

15. A computer system comprising:
  one or more processors; and
  one or more computer storage media storing computer-useable instructions that, when used by the one or more processors, cause the one or more processors to:
  detect initiation of an application within a live production environment;
  detect a selection of a private mode that limits edits within the application to an editor initiating the edits, wherein the private mode is selected using a tool builder deployment interface selectable by the editor for interchanging between the private mode and a general audience mode, and wherein the tool builder deployment interface is separate from the live production environment;
  detect a selection of a first customization to the application within the live production environment;
  initiate the first customization within the private mode of the live production environment;
  translate the first customization to processing data for a tool builder application to initiate implementation of the first customization, wherein the tool builder application comprises the tool builder deployment interface; and
  communicate the translated processing data to an intermediate destination for use by the tool builder application, wherein the translated processing data is automatically detectable by the tool builder application without communication directly to the tool builder application, and wherein upon detection of the translated processing data to the intermediate destination by the tool builder application, implementing the first customization.

16. The system of claim 15, further comprising detecting initiation of a tool builder application, wherein the tool builder application is a remote application.

17. The system of claim 16, wherein the intermediate destination is an interceptor tool.

18. The system of claim 17, wherein translated processing data is automatically communicated to the interceptor tool without a user indication.

19. The system of claim 18, wherein the interceptor tool communicates with both the application and a tool builder application separate from the application; and wherein the interceptor tool is a clipboard application.

20. The system of claim 15, wherein the instructions further cause the one or more processors to release the first customization upon detection that the private mode is deactivated.

* * * * *